(12) United States Patent
Pierce

(10) Patent No.: US 12,354,338 B2
(45) Date of Patent: Jul. 8, 2025

(54) SYSTEMS AND METHODS FOR CLASSING POLES

(71) Applicant: Pierce Construction and Maintenance Company, Inc., Petal, MA (US)

(72) Inventor: Werner G. Pierce, Petal, MS (US)

(73) Assignee: Pierce Construction and Maintenance Company, Inc.

( * ) Notice: Subject to any disclaimer, the term of this patent is extended or adjusted under 35 U.S.C. 154(b) by 542 days.

(21) Appl. No.: 17/649,894

(22) Filed: Feb. 3, 2022

(65) Prior Publication Data

US 2022/0245930 A1    Aug. 4, 2022

Related U.S. Application Data

(60) Provisional application No. 63/145,268, filed on Feb. 3, 2021.

(51) Int. Cl.
| | | |
|---|---|---|
| *G06T 7/00* | (2017.01) |
| *G06T 5/50* | (2006.01) |
| *G06T 17/10* | (2006.01) |
| *G06V 10/80* | (2022.01) |

(52) U.S. Cl.
CPC ............. *G06V 10/809* (2022.01); *G06T 5/50* (2013.01); *G06T 7/0004* (2013.01); *G06T 17/10* (2013.01)

(58) Field of Classification Search
CPC ........ G06V 10/809; G06V 20/64; G06T 5/50; G06T 7/0004; G06T 17/10; G06T 2207/30161
See application file for complete search history.

(56) References Cited

U.S. PATENT DOCUMENTS

| | | | |
|---|---|---|---|
| 6,529,799 B1 * | 3/2003 | Paulk, Jr. ................ | B65C 7/001 700/227 |
| 2020/0318962 A1 * | 10/2020 | Gold ........................ | G01C 3/02 |

OTHER PUBLICATIONS

Kline, D. Earl, Chris Surak, and Philip A. Araman. "Automated hardwood lumber grading utilizing a multiple sensor machine vision technology." Computers and electronics in agriculture 41.1-3 (2003): 139-155. (Year: 2003).*

(Continued)

*Primary Examiner* — Amandeep Saini
*Assistant Examiner* — Denise G Alfonso
(74) *Attorney, Agent, or Firm* — DLA Piper, LLP (US)

(57) ABSTRACT

A pole classing system may include an array of three-dimensional (3D) scanners, programmable logic controller equipment, and a computing device. The computing device may control the array of the 3D scanners to generate images of a pole from different directions and positions, generate a first pole dataset comprising dimensions and features of the pole, determine a class for the pole based on the dimensions of the pole and a first set of pole standard parameters, generate a second pole dataset by selecting a partial first pole dataset, and transmit the second pole dataset to the programmable logic controller equipment. The programmable logic controller equipment may process, based on a second set of pole standard parameters, the second pole dataset, the images and the features of the pole to thereby optimize the determined class of the pole and generate an updated class of the pole.

18 Claims, 10 Drawing Sheets
(4 of 10 Drawing Sheet(s) Filed in Color)

(56) References Cited

OTHER PUBLICATIONS

Thomas, Liya, et al. "Defect detection on hardwood logs using laser scanning." Wood and Fiber Science (2006): 682-695. (Year: 2006).*
Schmoldt, Daniel L., Jing He, and A. Lynn Abbott. "Comparison of several artificial neural network classifiers for CT images of hardwood logs." Machine vision applications in industrial inspection VI. vol. 3306. SPIE, 1998. (Year: 1998).*
Hu, Junfeng, et al. "Deep learning for use in lumber classification tasks." Wood Science and Technology 53 (2019): 505-517. (Year: 2019).*
Nystrom, Jan, and Olle Hagman. "Methods for detecting compression wood in green and dry conditions." Polarization and Color Techniques in Industrial Inspection. vol. 3826. SPIE, 1999. (Year: 1999).*
Siekański, Piotr, et al. "On-line laser triangulation scanner for wood logs surface geometry measurement." Sensors 19.5 (2019): 1074. (Year: 2019).*
Wolfe, Ronald W. "Design stress derivation for ANSI poles." Proceedings, International conference on utility line structures. 2000. ( Year: 2000).*
ANSI 05.1—2017; "Wood Poles: Specifications and Dimensions"; American National Standard For Wood Utility Products; pp. 1-50; Feb. 23, 2017; www.awpa.com.

\* cited by examiner

SYSTEMS AND METHODS FOR CLASSING POLES

CROSS REFERENCE TO RELATED APPLICATION

This application claims the benefit of priority from U.S. Non-Provision Application No. 63/145,268, filed Feb. 3, 2021, the entirety of which is incorporated by reference herein.

FIELD OF THE DISCLOSURE

The present disclosure relates to efficiently and automatically classing poles based on standards in the lumber industry.

BACKGROUND

The existing systems of classifying poles and pilings are generally accomplished by unsafe manual methods. The methods are also time consuming and may be subject to misinterpretation of standards and errors resulting in the possible rejection of poles during the pole classifying process. For example, the existing methods and systems normally require operators to reach out to touch the poles in order to figure out the class of pole and/or any problems with a pole. There is a need for providing an efficient and automated system and method to provide accurate pole measurements based on industry standards while avoiding manual actions during the pole classifying process.

BRIEF DESCRIPTION OF THE FIGURES

The patent or application file contains at least one drawing executed in color. Copies of this patent or patent application publication with color drawings will be provided by the Office upon request and payment of the necessary fee.

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Embodiments of the present disclosure provide systems and method for efficiently and automatically classing poles based on industrial standards provided by the American National Standards Institute [ANSI]. As those of ordinary skill will appreciate, some embodiments may be extended to use with other standards.

In one or more embodiments, a pole classing system may include various hardware equipment including, but not limited to:

1) a system for conveying poles or pilings along a group of decks and conveyors for the purpose of classing the pole or piling;
2) specially designed conveyors for holding a chain steady;
3) specially designed chain flights to ensure that pole rolling and slippage is reduced to a minimum;
4) a vector motor used to ensure accurate measurements;
5) a three-dimensional (3D) High Definition scanner system running proprietary software;
6) programmable logic controller (PLC) equipment configured to control the pole movement and perform data collection of classing the pole;
7) a computer system or software module for pole classing optimization;
8) a swing style cut off saw or other cutting devices;
9) a paint spraying system; and
10) a label printer and stapler or other marking device.

Figure 1A:
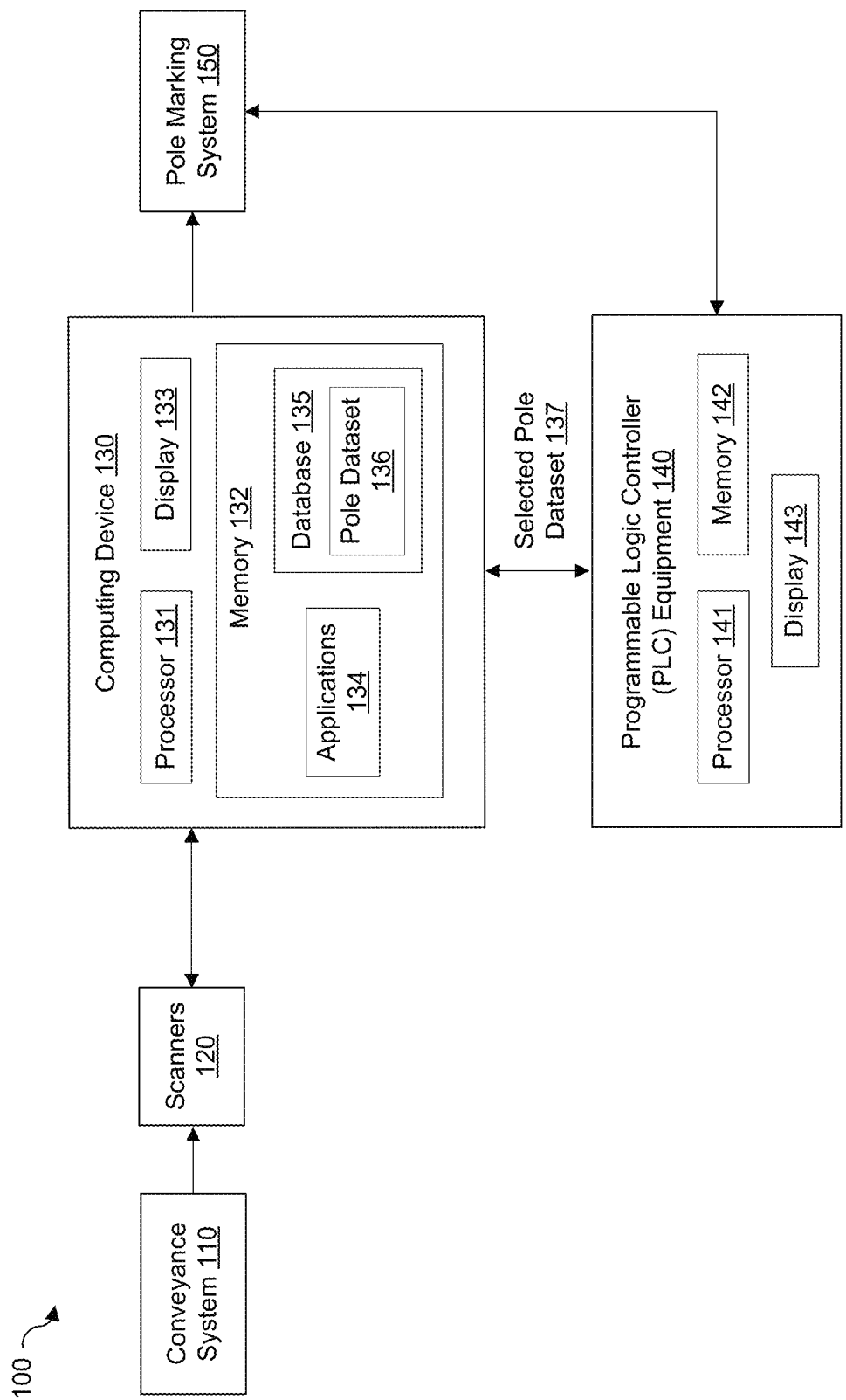
FIG. 1A illustrates a block diagram of an example pole classing system for classing poles according to some embodiments of the present disclosure.

FIG. 1A illustrates a block diagram of an example pole classing system 100 for classing poles in accordance with the disclosed principles. The pole classing system 100 may include a conveyance system 110, an array of 3D scanners 120, a pole classing system 100, a computing device 130, programmable logic controller (PLC) equipment 140, a pole marking system 150, and a network (not shown). The network may include the Internet and/or other public or private networks or combinations thereof. Different systems and devices of the pole classing system 100 may communicate with each other via the network or, in some embodiments, by direct connection or other means.

The conveyance system 110 may be used for conveying poles along a group of decks and conveyors for scanning and classing the poles. As used herein, the term "poles" may include, but is not limited to, poles, pilings, and any other similar physical objects. The conveyance system 110 may include a group of infeed decks and conveyors. An infeed conveyor may be constructed of formed steel plate and may include a chain way to ensure the chain is held steady. For example, the infeed decks and conveyors may be powered by vector motors configured to reduce the need for pulse encoders and allow more accurate length measurements. A fabricated chain flight can be welded to the chain to reduce log roll and slippage. The conveyance system 110 may include a vector motor operating to ensure accurate measurements of the pole during measurement, as described in detail below. The conveyor may be controlled by the vector motor using the Common Industrial Protocol or Control and Information Protocol (CIP) motion for reducing the need for pulse encoders and allowing more accurate length measurements. The conveyance system 110 may include specially designed conveyors for holding the chain steady. The conveyance system 110 may include specially designed chain flights operating to control pole movement by reducing the pole rolling and slippage to a minimum.

Figure 1B:
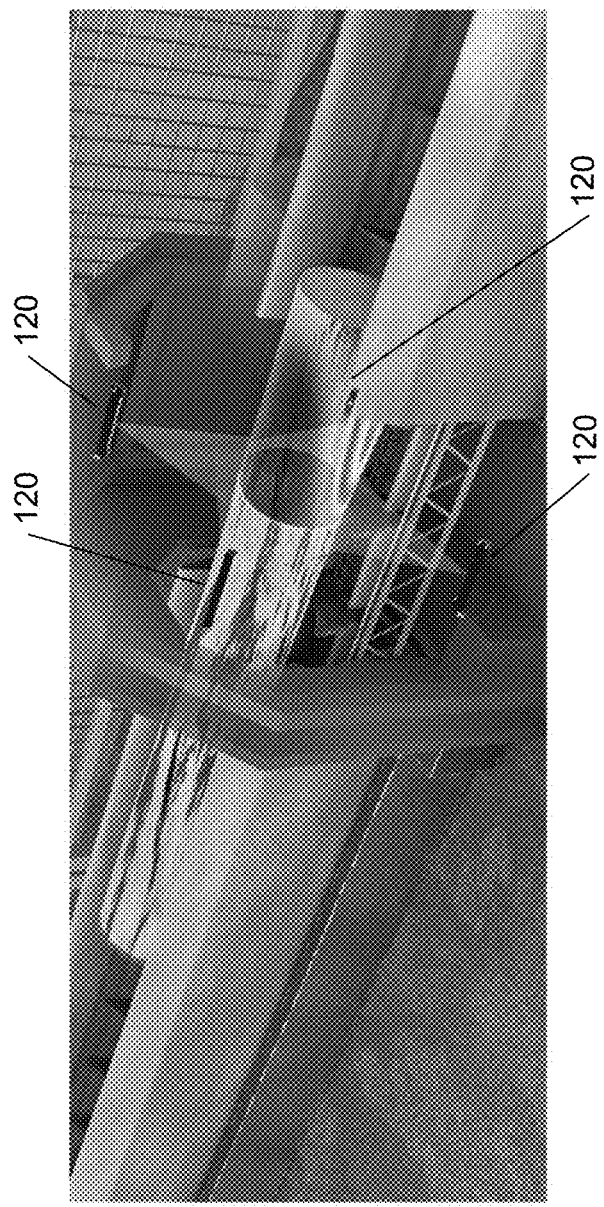
FIG. 1B illustrates an example of a pole being scanned by an array of 3D scanners of the example pole classing system according to some embodiments of the present disclosure.

An array of 3D scanners 120 may operate to digitally capture a physical shape of a pole and transmit the captured pole images to the computing device 130 through the network. An example array of 3D scanners 120 are shown in FIG. 1B. The scanner array of FIG. 1B is an example only, and other arrangements for the scanner array may be possible. The captured pole images may be stored in the database 135. The 3D scanners 120 may be time of travel type of scanners (e.g., LiDAR-scanners) or triangulation-based scanners. For a LiDAR-scanner, the time of travel of the laser between its emission and reception provides the object surface's geometrical information. For a triangulation-based scanner, the emission of a rectilinear laser beam deforms on contact with the object. Through the camera, the 3D scanner analyzes the deformation of the line emitted by the laser on the reliefs of the object in order to determine, by means of trigonometric calculations, its position in space. The angle formed between the camera and the beam of the laser, the distance from the camera to the object and the distance of the laser source to the object used to calculate the time taken by the laser to make a round trip, are the parameters to determine the spatial coordinates of the object. As seen in FIG. 1B, scanners 120 may be able to identify pole features that may not necessarily be visible to the naked eye (e.g., indicated by the gradients overlaid on the pole). This is described in greater detail with respect to FIGS. 5-6C below.

The computing device 130 (e.g., a computer) may include a processor 131, a memory 132, a display 133 and communication interface for enabling communication over a network (not shown). The memory 132 may store various software applications 134 or other models in the context of computer-executable instructions executed by the processor 131 for implementing methods, processes, systems and embodiments described in the present disclosure. The applications 134 may include an adaptive software application with image processing algorithms executed to control the scanners 120 and receive the images captured by the scanners 120. The adaptive software application may further be executed to process the pole images to determine a pole dataset 136 and further generate pole models used for the pole classification. Database 135 may be included in the computing device 130 or coupled to or in communication with the processor 131 via the network. Database 135 may be configured to store the captured pole images, pole dataset 136 and generated 3D pole models.

In some embodiments, the pole classing system 100 may include an Anybus® X-gateway which provides a fast transfer of a partial pole dataset with seamless communications between the computing device 130 and the PLC equipment 140 through the network. Other embodiments may utilize other data communication systems and methods.

The PLC equipment 140 may include a processor (e.g., a PLC or other type of processor) 141 and a memory 142 storing a classing algorithm executed to class or classify the poles based on the selected pole dataset 137, defects on the pole surface and wood pole standards provided by the ANSI. The classing result of the poles may be stored in the memory 142 or the database 135.

The pole marking system 150 may include a swing style cut off saw or other cutting devices, a paint spraying system and a label printer and stapler. The pole marking system 150 may be operated to mark the classified poles with standard tags and marks based on the classing result. The paint spraying system may operate to print out the classing result of the poles. The label printer and stapler may automatically tag or mark the poles with the classing result.

ANSI 05.1-2017 Standard

ANSI 05.1-2017 standard ("ANSI standard") provides minimum specifications for the quality and dimensions of wood poles for particular species. The pole classing processes may be implemented based on the dimensions of the wood poles and limits of knot (e.g., a type of defect) sizes listed in the ANSI 05.1-2017 standard. For example, Tables 2 and 8M of the ANSI 05.1-2017 standard show the limits of knot sizes and example dimensions of southern yellow pine.

Table 2—Limits of Knot Sizes (ANSI)

TABLE 2

Limits of Knot Sizes

| | Maximum sizes permitted | | |
| --- | --- | --- | --- |
| | Diameter of any single knot (in) and (mm) | | Sum of diameters of all knots (and cone holes, if applicable) greater than 0.5 inch (13 mm) in any 1-foot (0.31 m) section |
| Length of Pole | Classes H6 to 3 | Classes 4 to 10 | (in) and (mm) All Classes |
| 45 feet (13.7 m) and shorter | | | |
| Lower half of length | 3 in (80 mm) | 2 in (50 mm) | ⅓ of the average circumference |
| Upper half of length | 5 in (130 mm) | 4 in (100 mm) | of the same 1-foot (0.31 m) section or 8 inches (.20 m), whichever is greater, but not to exceed 12 inches (0.31 m)[1] |
| 50 feet (15.2 m) and longer | | | |
| Lower half of length | 4 in (100 mm) | 4 in (100 mm) | ⅓ of the average circumference |
| Upper half of length | 6 in (150 mm) | 6 in (150 mm) | of the same 1-foot (0.31 m) section or 10 inches (0.25 m), whichever is greater, but not to exceed 14 inches (.36 m) [1] |

NOTE -
See clause 4 and Tables 3 through 10 (or Tables 3M through 10M) for pole classes.
[1] Both upper and lower halves

TABLE 8M

Dimensions of Douglas-fir and Southern Pine poles (ANSI)
Table 8M - Metric dimensions of Douglas-fir (both types) and Southern pine poles (Fiber Strength 55.2 MPa)

| | Approximate | Class | | | | | | | | | | | | | | |
|---|---|---|---|---|---|---|---|---|---|---|---|---|---|---|---|---|
| | Groundline[1] distance from | H6 | H5 | H4 | H3 | H2 | H1 | 1 | 2 | 3 | 4 | 5 | 6 | 7 | 9 | 10 |
| Length | | Minimum circumference at top (m) | | | | | | | | | | | | | | |
| of pole (m) | butt (m) | 0.99 | 0.94 | 0.89 | 0.84 | 0.79 | 0.74 | 0.69 | 0.64 | 0.58 | 0.53 | 0.48 | 0.43 | 0.38 | 0.38 | 0.30 |
| | | Minimum circumference at 1.8 m from butt (m) | | | | | | | | | | | | | | |
| 6.1 | 1.2 | — | — | — | — | — | — | 0.79 | 0.74 | 0.69 | 0.64 | 0.58 | 0.53 | 0.50 | 0.44 | 0.36 |
| 7.6 | 1.5 | — | — | — | — | — | — | 0.85 | 0.80 | 0.75 | 0.70 | 0.65 | 0.58 | 0.55 | 0.50 | 0.38 |
| 9.1 | 1.7 | — | — | — | — | — | — | 0.93 | 0.86 | 0.81 | 0.75 | 0.70 | 0.64 | 0.60 | 0.52 | — |
| 10.7 | 1.7 | — | — | — | — | 1.10 | 1.05 | 0.99 | 0.93 | 0.86 | 0.80 | 0.74 | 0.69 | 0.64 | — | — |
| 12.2 | 1.8 | — | — | 1.30 | 1.23 | 1.17 | 1.10 | 1.04 | 0.98 | 0.91 | 0.85 | 0.79 | 0.72 | — | — | — |
| 13.7 | 2.0 | 1.49 | 1.42 | 1.36 | 1.30 | 1.23 | 1.16 | 1.09 | 1.03 | 0.95 | 0.89 | 0.83 | 0.76 | — | — | — |
| 15.2 | 2.1 | 1.55 | 1.49 | 1.41 | 1.35 | 1.28 | 1.21 | 1.14 | 1.07 | 0.99 | 0.93 | 0.86 | — | — | — | — |
| 16.8 | 2.3 | 1.61 | 1.54 | 1.47 | 1.40 | 1.32 | 1.26 | 1.18 | 1.10 | 1.03 | 0.97 | — | — | — | — | — |
| 18.3 | 2.4 | 1.66 | 1.59 | 1.51 | 1.45 | 1.37 | 1.30 | 1.22 | 1.14 | 1.07 | 0.99 | — | — | — | — | — |
| 19.8 | 2.6 | 1.71 | 1.64 | 1.56 | 1.49 | 1.41 | 1.33 | 1.26 | 1.18 | 1.10 | 1.03 | — | — | — | — | — |
| 21.3 | 2.7 | 1.75 | 1.69 | 1.61 | 1.54 | 1.45 | 1.37 | 1.30 | 1.22 | 1.14 | 1.05 | — | — | — | — | — |
| 22.9 | 2.9 | 1.80 | 1.73 | 1.65 | 1.57 | 1.50 | 1.41 | 1.33 | 1.24 | 1.17 | — | — | — | — | — | — |
| 24.4 | 3.1 | 1.84 | 1.77 | 1.69 | 1.61 | 1.52 | 1.45 | 1.37 | 1.28 | 1.19 | — | — | — | — | — | — |
| 25.9 | 3.2 | 1.89 | 1.82 | 1.73 | 1.65 | 1.56 | 1.49 | 1.40 | 1.31 | 1.22 | — | — | — | — | — | — |
| 27.4 | 3.4 | 1.93 | 1.85 | 1.77 | 1.69 | 1.60 | 1.51 | 1.42 | 1.35 | 1.24 | — | — | — | — | — | — |
| 29.0 | 3.4 | 1.97 | 1.89 | 1.80 | 1.71 | 1.64 | 1.55 | 1.45 | 1.37 | — | — | — | — | — | — | — |
| 30.5 | 3.4 | 2.01 | 1.93 | 1.84 | 1.75 | 1.66 | 1.57 | 1.49 | 1.40 | — | — | — | — | — | — | — |
| 32.0 | 3.7 | 2.04 | 1.96 | 1.88 | 1.79 | 1.70 | 1.60 | 1.51 | 1.42 | — | — | — | — | — | — | — |
| 33.5 | 3.7 | 2.08 | 1.99 | 1.91 | 1.82 | 1.73 | 1.64 | 1.54 | 1.45 | — | — | — | — | — | — | — |
| 35.1 | 3.7 | 2.12 | 2.03 | 1.94 | 1.84 | 1.75 | 1.66 | 1.56 | 1.47 | — | — | — | — | — | — | — |
| 36.6 | 3.7 | 2.16 | 2.06 | 1.97 | 1.88 | 1.78 | 1.69 | 1.59 | 1.50 | — | — | — | — | — | — | — |
| 38.1 | 3.7 | 2.18 | 2.10 | 1.99 | 1.91 | 1.80 | 1.71 | 1.61 | 1.51 | — | — | — | — | — | — | — |

NOTE -
Classes and lengths for which circumferences at 1.8 m from the butt are listed in boldface type are the preferred standard sizes. Those shown in light type are included for engineering purposes only.
[1]The figures in this column are not recommended embedment depths; rather, these values are intended for use only when a definition of groundline is necessary in order to apply requirements relating to scars, straightness, etc.

The poles may be classified based on the pole dimensions including the pole length and pole circumference for particular species.

Pole Length

Based on the ANSI standard, poles less than 50 feet (15.2 m) in length shall be not more than 3 inches (80 mm) shorter or 6 inches (150 mm) longer than nominal length. Poles of 50 feet (15.2 m) or more in length shall be not more than 6 inches (150 mm) shorter or 12 inches (0.31 m) longer than nominal length. Length shall be measured between the extreme ends (the top and the bottom) of the pole.

Pole Circumference

Poles are classed while in the green condition, after bark removal and/or shaving. Subsequently, there may be some shrinkage due to conditioning, seasoning, or while in service. Therefore, this shrinkage, which is usually about 2 percent as the pole dries below fiber saturation, should be recognized if re-measuring circumference at a later date.

Table 8M in the ANSI standard lists the minimum circumferences at 6 feet (1.8 m) from the butt and at the top, for each length and class of pole. The circumference at 6 feet (1.8 m) from the butt of a pole shall be not more than 7 inches (0.18 m) or 20 percent larger than the specified minimum, whichever is greater. The top dimensional requirement shall apply at a point corresponding to the minimum length permitted for the pole.

Pole Classification

The true circumference class shall be determined as follows: Measure the circumference at 6 feet (1.8 m) from the butt. This dimension will determine the true class of the pole, provided that its top (measured at the minimum length point) is large enough. Otherwise, the circumference at the top will determine the true class, provided that the circumference at 6 feet (1.8 m) from the butt does not exceed the specified minimum by more than 7 inches (0.18 m) or 20 percent, whichever is greater.

Pole Classes

As listed in Table 8M in the ANSI standard, poles meeting the requirements of this standard are grouped in the identified classes, based on their circumference measured 6 feet (1.8 m) from the butt, after bark removal and/or shaving. Poles of a given class and length are designed to have approximately the same load-carrying capacity, regardless of species.

Figure 2:
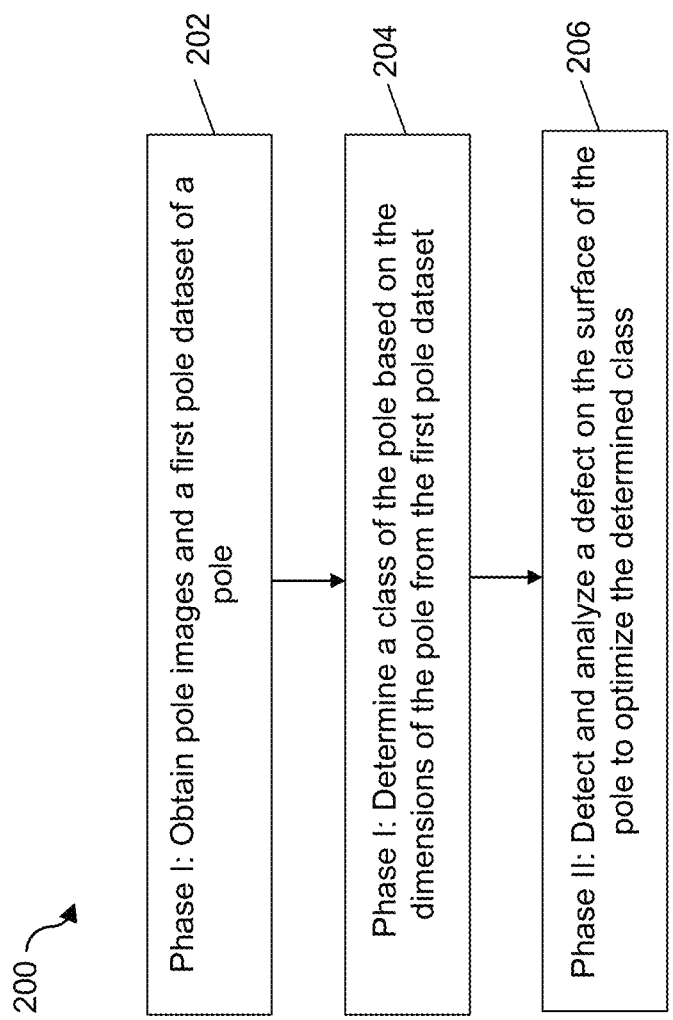
FIG. 2 is a flowchart illustrating an example process for determining a class for a pole based on dimensions and features of the pole in accordance with some embodiments disclosed herein.

In some embodiments, the pole classing system 100 may preform two phases of pole classing processes. FIG. 2 is a flowchart illustrating an example process 200 for determining a class for a pole based on dimensions and features of the pole in accordance with some embodiments disclosed herein.

At 202 which is indicative of a first part of Phase I process, the pole classing system 100 may obtain pole images and a first pole dataset 136 of a pole.

At 204 which is indicative of a second part of Phase I process, the pole classing system 100 may determine a class of the pole based on the dimensions of the pole obtained from the pole images and the pole dataset 136. The Phase I process may not consider and analyze knots and surface defects in the pole. Defects or knots on the surface of the pole may impact the class of the pole. The pole classing system 100 may be implemented to facilitate a smooth and uncomplicated migration to the Phase II process.

At 206 which is indicative of Phase II process, the pole classing system 100 may detect one or more surface defects (e.g., knots) in the pole and analyze measurable features of the detected defects to optimize the determined class. The partial pole data collected by the scanners 120 during the Phrase I may be used to implement the Phase II process. During the Phase II process, these defects may be annunciated to the operator to confirm whether the defects affect the pole class decision.

Figure 3:
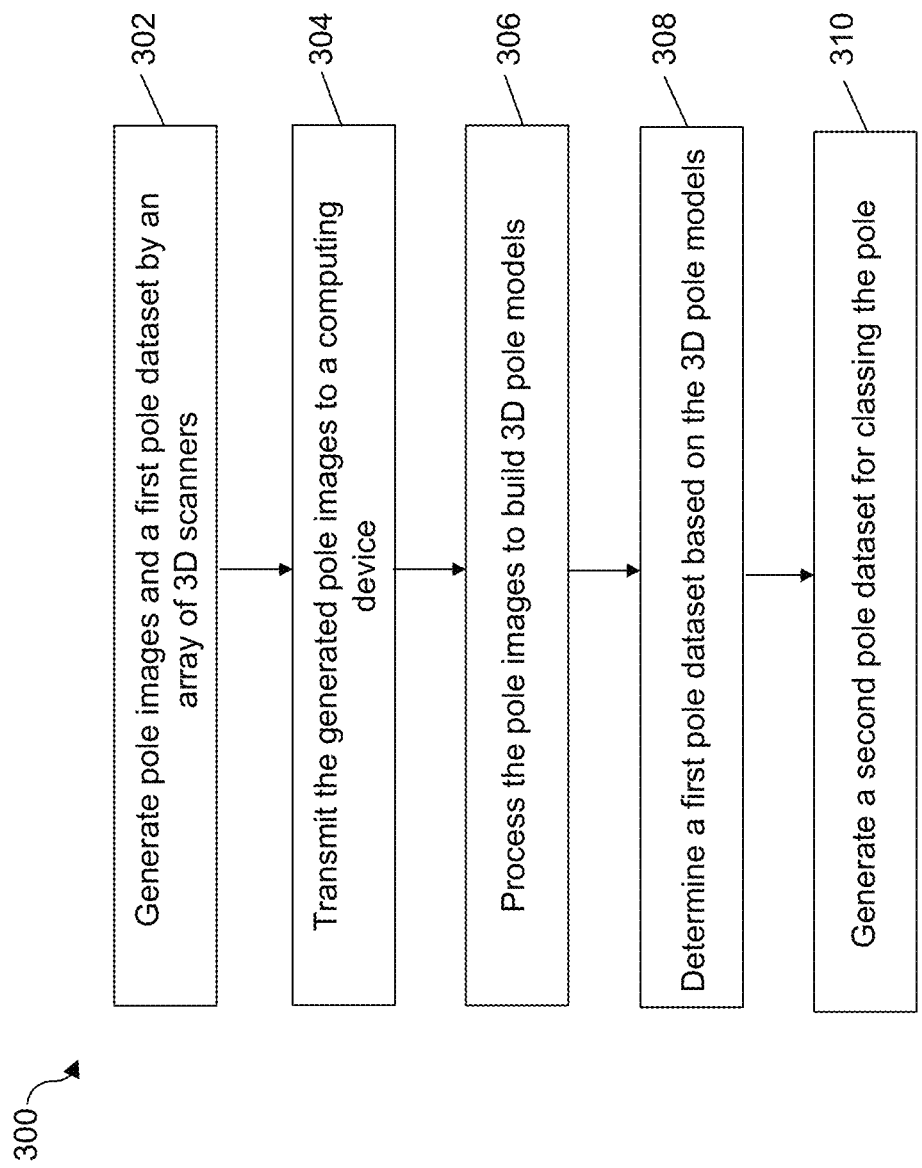
FIG. 3 is a flowchart illustrating is a flowchart illustrating a part of example Phase I process for obtaining pole images and determining pole data in accordance with some embodiments of the present disclosure.

FIG. 3 is a flowchart illustrating a part of example Phase I process for obtaining pole images and determining pole data in accordance with some embodiments disclosed herein.

At 203, an array of 3D scanners 120 are operated to capture and generate images of a pole, the scanner 120 may operate to scan a pole to capture the pole images from different directions and determine pole dataset 136 based on the pole images. The pole may be passed through an array of 3D scanners 120 which may be mounted at different directions and positions to capture and produce a full 360 view of the pole. For example, the 3D scanners 120 may be an array of LiDAR scanners mounted to the top right, top left, bottom right and bottom left of the pole such that the scanners 120. The conveyor may move the pole through these scanners. Each scanner 120 may be controlled by the computing device 130 to execute an adaptive software application 134 such that each scanner 120 may provide laser scanning of the pole with an array of lasers from its own perspective to capture the pole images. The distances to certain positions of the pole may be calculated based on the pole images. The distance to scan the pole may be set to 4 mm or 6 mm via the 3D scanner application by a user or an operator operating the computing device 130. The captured images of the pole may be used to generate sweep, and crook features as well as taper, circumference, the full length of the pole. This pole image data may be used to determine the pole circumference at the 3 or 6 feet point from the butt of the pole, or at any other desired location along the total length. The operator may see knots, splits, and tear outs.

At 304, each scanner 120 may transmit the captured and generated pole images to the computing device 130 through the network. The scanners 120 may transmit and store the pole images in the database 135. The pole images may be analyzed by an adaptive software application 134 to determine a first dataset 136 and build one or more 3D pole models for the pole.

At 306, the processor 131 of the computing device 130 may execute an adaptive software application 134 to process the pole images to build digital 3D pole models. For example, the adaptive software application 134 may be Activision™ 3D model software executed to build one or more pole models. Users may configure one or more settings or parameters within the Activision™ 3D model software in order to view and/or manipulate the models in some embodiments.

At 308, the adaptive software application 134 may be executed by the processor 131 to determine the pole dataset 136 (e.g., a first pole dataset 136) based on the 3D pole models. The first pole dataset 136 may include the dimensions and features of the pole. The dimensions of the pole may include the full length of the pole, pole circumferences at any desired locations from the pole butt, and any other dimension data of the pole, etc. The circumference of the pole may be obtained at the 3 or 6 feet point from the butt of the pole, or at any other desired locations along the pole. The pole dataset 136 may include pole sweep and crook features, color, taper, and the excess data associated with the defects of the pole. The features of the pole comprise at least one of a type, a location and dimensions of a defect on the surface of the pole.

Figure 6A:
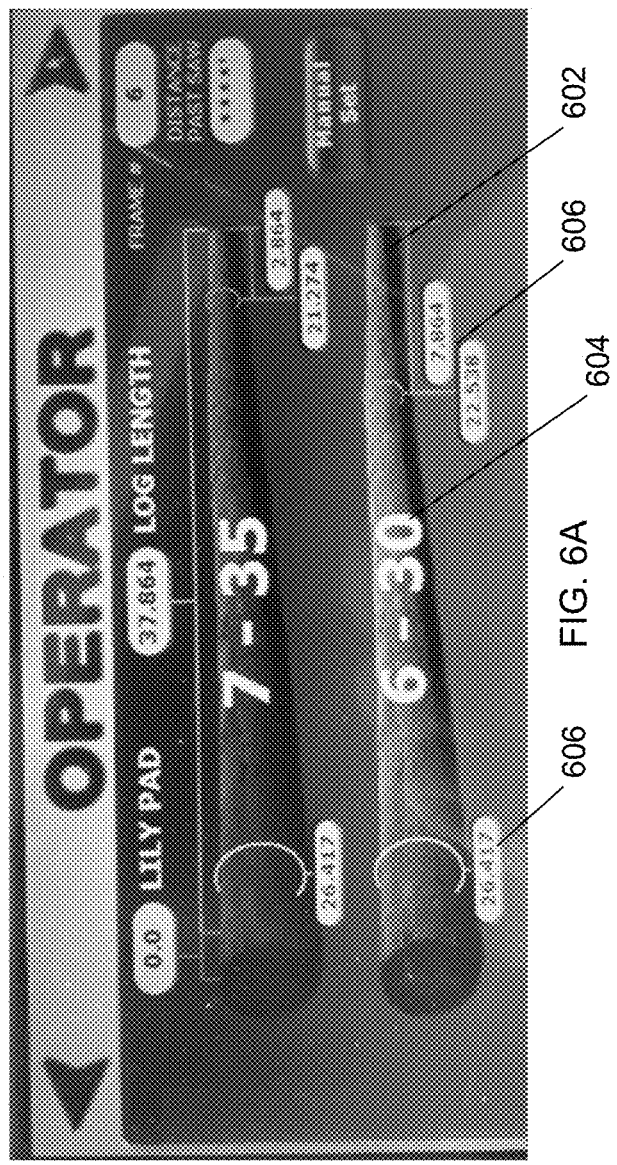
FIGS. 6A-6C are screenshots of a user interface (UI) of the example pole classing system in accordance with some embodiments disclosed herein.
Figure 6B:
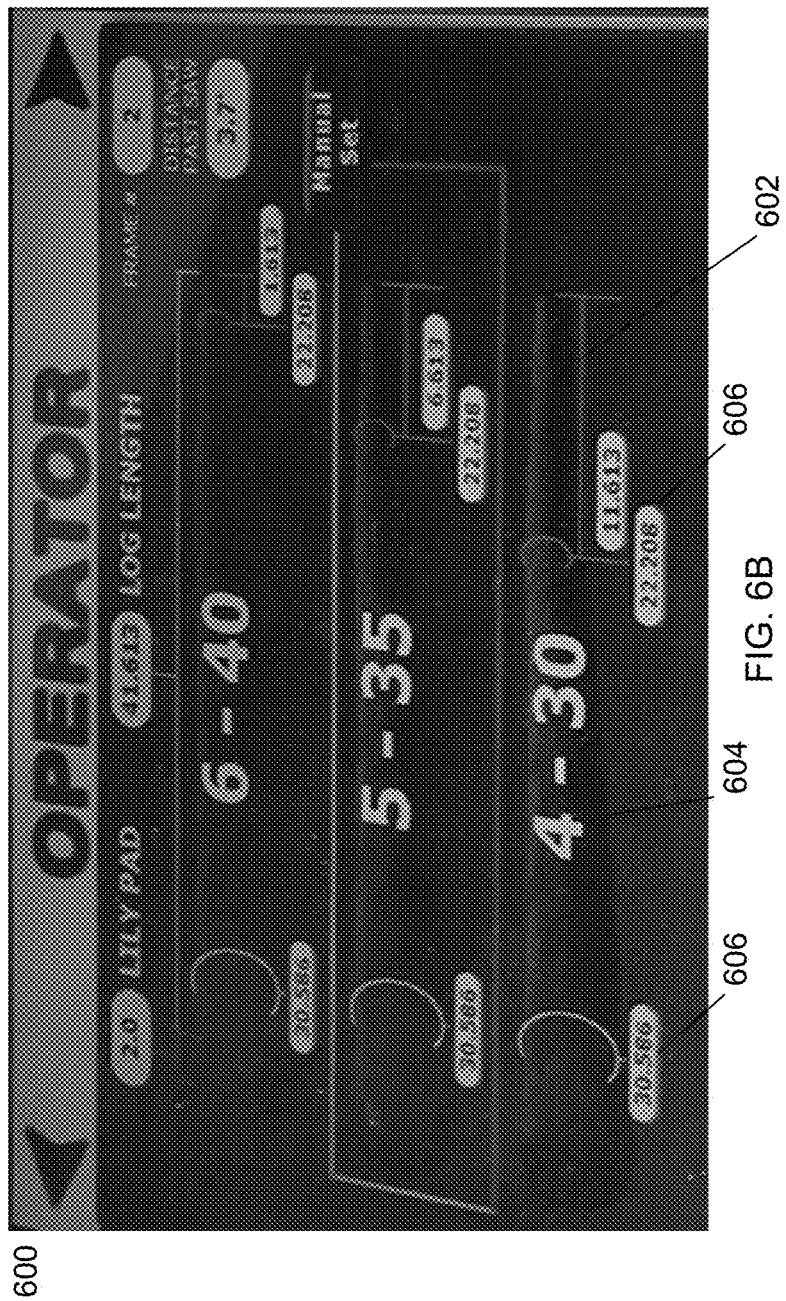
Figure 6C:
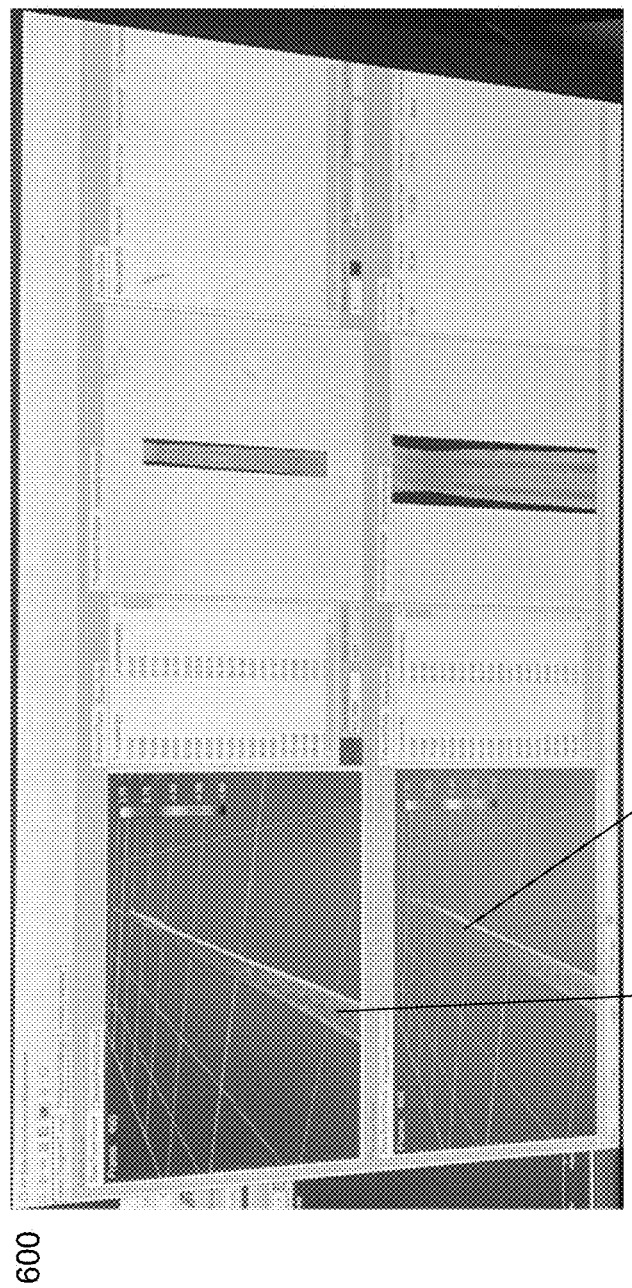

The adaptive software application 134 may generate a graphical representation to present the digital 3D pole models with the dimensions and or features of the pole on a display 133 of the computing device 130. The 3D pole models may be presented and shown as different colors. FIGS. 6A-6C are screenshots of a UI 600 of the example pole classing system in accordance with some embodiments disclosed herein. As shown, UI 600 may show at least one representation of at least one pole 602 as a graphical element with classification 604 and dimensions 606 called out.

Returning to FIG. 3, at 310, the adaptive software application 134 may be executed to select a partial first pole dataset 136 to generate a second pole dataset 137 for classing the pole. The second pole dataset 137 is selected to include dimensions of the pole which may be used for classing the pole in a Phase II process 300 as described below. The second pole dataset 137 may include the excess data such as the types of defects that are used to properly modify and optimize the class of the pole. The selected pole dataset 137 may be transmitted to the processor 141 of the PLC equipment 140 through the Anybus® X-gateway, for example.

The processor 141 of the PLC equipment 140 may execute a classing algorithm to process the second pole dataset 137 for classing the pole based on a set of pole ANSI standards. Details about classing the pole will be described with respect to FIG. 4 below.

Figure 4:
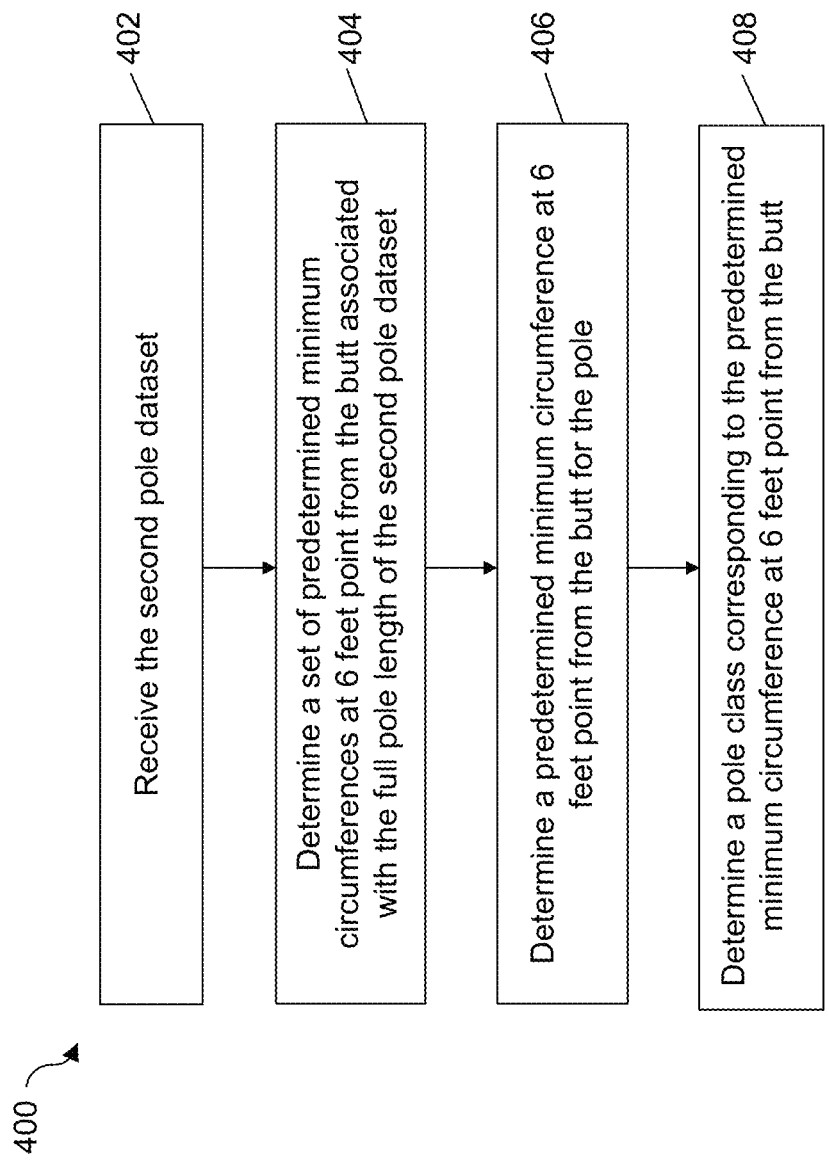
FIG. 4 is a flowchart illustrating another part of an example Phase I process for classing a pole based on pole dimensions in accordance with some embodiments disclosed herein.

FIG. 4 is a flowchart illustrating another part of an example Phase I process 300 for classing poles based on pole dimensions in accordance with some embodiments disclosed herein. The processor 141 of the PLC equipment 140 may execute a classing algorithm to further process the second pole dataset 137 for classing the pole based on a set of pole ANSI standards. During the Phase II, the PLC equipment 140 of the pole classing system 100 may include a processor 141 to execute a classing algorithm to process the second pole dataset 137 for classing the poles.

At 402, the PLC equipment 140 may receive the second pole dataset 137 which includes at least the full pole length, the circumference at 6 feet point from the butt of the pole, the circumference of top of the pole, the bottom pole dimension, the head pole dimension, types of defects and locations and dimensions of the defects, etc.

In some embodiments, the classing algorithm may be executed to determine a class for the pole based at least the full pole length and the circumference at 6 feet point from the butt of the pole according to a first set of predetermined standard parameters illustrated in Table 3.

As shown in Table 3 of the ANSI standards, the first set of pole standard parameters comprises at least one of a set of predetermined standard lengths of a pole, a set of predetermined minimum circumferences at 6 feet from the pole butt associated with a respective predetermined pole length, and a predetermined minimum circumference at the top of the pole. For example, a first set of predetermined standard lengths of a pole may be 20, 25, 30, 40, 45 feet, etc. For each predetermined standard length of the pole, there are a set of predetermined minimum circumferences at 6 feet from the pole butt in Table 3. Each class is associated with a respective predetermined minimum circumference at 6 feet from the pole butt. For example, for a 30 feet length of the pole, the predetermined minimum circumferences at 6 feet point from the butt of the pole are 45.5 inches for Class 1 and 43 inches for Class 2, respectively.

At 404, based on the obtained full pole length and the first set of predetermined standard parameters, the classing algorithm may be executed to determine a set of predetermined minimum circumferences at 6 feet point from the butt associated with the full pole length of the second pole dataset 137.

At 406, based on the full pole length and the circumference at 6 feet point from the butt of the second pole dataset 137, the classing algorithm may be executed to determine a predetermined minimum circumference at 6 feet point from the butt which is closest to the circumference at 6 feet point from the butt of the second pole dataset 137.

At 408, a class of the pole may be determined to correspond to the predetermined minimum circumference at 6 feet point from the butt.

At 410, if a class is determined for the pole, the classing algorithm may be executed to determine if the circumference of top of the pole meets a predetermined minimum circumference at the top of the pole corresponding to the determined class. For example, as illustrated in Table, for a 30 feet length of the pole, the predetermined minimum circumferences at 6 feet point from the pole butt are 45.5 inches for Class 1 which requires a predetermined minimum circumference at the top of the pole to be 27 inches.

Defects on the surface of the pole may impact the class of the pole. The classing algorithm may be executed by the processor 141 to detect and locate defects such as knots, splits, and tear outs on the pole surface based on the second pole dataset 137 and generated pole images and 3D models. The classing algorithm may be executed to localize the defects, determine the types of the detected defects and characteristics or parameters of the defects located on the surface of the pole.

Figure 5:
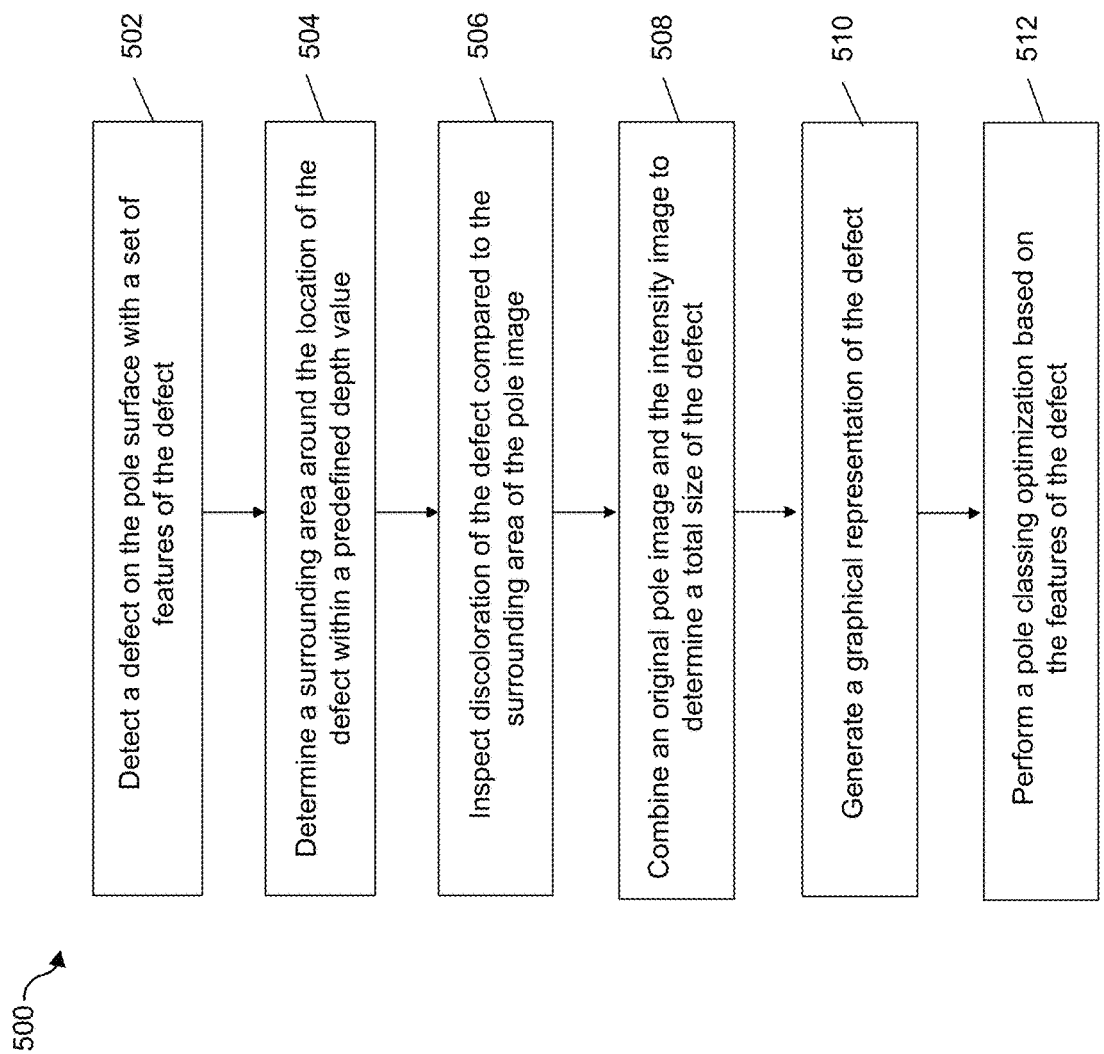
FIG. 5 is a flowchart illustrating an example Phase II process for optimizing a pole class based on pole defects in accordance with some embodiments disclosed herein.

FIG. 5 is a flowchart illustrating an example Phase II process 500 for optimizing the pole class based on the determined pole class in the process 400 and detected defects in accordance with some embodiments disclosed herein.

At 502, the classing algorithm may be executed to detect and localize a defect on the pole surface based on the generated pole images and 3D pole models. Detecting the defect may include determining a set of features of the defect including a type, location, depth and length of the defect. For example, a defect may be detected and extended into the pole surface at a location shown on the pole image. The classing algorithm may be executed to optimize the pole class based on the characteristics or features of the defect and a second set of standard parameters illustrated in Table 2. The second set of standard parameters includes a diameter (width, length), a depth of a defect or knot. The type of defects detected during the Phase II may be "Spike Knots" or surface scars based on whether a defect meets or exceeds some standard characteristics or features. An example defect may be detected to have two characteristics or features, including: (1) the depth of a defect extending into the interior of the pole beneath the surface of the pole (e.g., by one inch); and (2) the length of the defect running a predetermined length (e.g., six inches). As required by ANSI standards, the diameter of any single knot and the sum of knot diameters in any 1-foot (31 cm) section shall not exceed the limits of Table 2.

At 504, in response to detecting a defect (e.g., a knot) with detected features of the defect, the classing algorithm may be executed to determine a surrounding area around the location of the detected defect in the pole image until the depth of the defect is less than a predefined depth value, for example, ⅛ inch.

At 506, the classing algorithm may be executed to use the surrounding area as a location anchor on an intensity image of the defect to further inspect discoloration of the intensity image compared to the surrounding area of an original pole image. The features of the defect may be shown as different colors rather than intensity such that the pole may be classed and graded based on the color which indicates the class of the pole. For example, the defect may be displayed on an operator's screen giving the location and diameter of the defect. The defect may be shown as an area of contrasting color relative to the surrounding, non-defective portion of the pole. Example color-coded representations 608 are shown in FIG. 6C, for example.

Returning to FIG. 5, at 508, the classing algorithm may be executed to combine the two images (e.g., the original pole image and the intensity image) to determine the total size of the defect and generate a Pass/Fail flag while displaying the images (height and intensity) with the defects highlighted. The defects may be localized by their y-dimension along the length of the pole, and by their location in the x-z plane at that y-location. Information may be presented to the operator in terms of degrees relative to the vertical axis. The pass/fail flag may be generated based on the ANSI specifications for the pole being scanned. If a defect cannot be removed and produce a usable pole, the pole may be flagged with a fail flag and rejected. Poles flagged for failing may be reexamined by an operator to determine whether they should be reentered (e.g., used as a pole per the specifications or for other purposes).

At 510, the classing algorithm may be executed to generate a graphical representation of the defect on a display 143 of the PLC equipment 140 operated by an operator. The 3D pole models generated in the Phase I process may be used to show a visual representation of the defect in the Phase II process. The dimensions of the detected defect may be presented with the 3D pole models on the display 143 to indicate the diameter, length, width (at the widest point) and depth (e.g., at the deepest point) that the defect which extends beneath the surrounding surface of the pole. The location(s) of the detected defect(s) may be indicated on the pole image or model using a graphical indicator at the point on the pole image or model where the defect exists.

At 512, the class of the pole may be reevaluated and updated based on the detected features of the defect with respect to the predetermine standard parameters of a pole class in Table 3. If an operator is not satisfied with the standards of the pole classification, the pole may be passed as a cull (unprocessed) from the group and be examined and processed on the yard.

These graphical representations of the defect with the location indicators may allow the operator to decide on the most effective and efficient means of handling the pole to allow for it to be properly processed, but with minimal disruption to production. For example, a detected defect may be cut out if it resides close enough to one end of the pole for this action to be efficiently completed. Once a certain classification may be determined for the pole, a pole may be cut to meet the predetermined standard parameters of the pole. The class of the pole may be updated based on the updated pole length due to the cutting according to the ANSI standards. In a position that a pole is cut, a set of related classing links may be generated and presented to the operator on the display 143 of the PLC equipment 140. The operator may choose or confirm a certain class for the pole via the display 143 of the PLC equipment 140 such that a certain class may be determined for the pole.

The classified pole may be painted and marked through a pole marking system 150. For example, the classified pole may automatically advance to a cutoff saw where a trim is made if required. The classified pole then advances to the correct length and the top may be trimmed. The class pole may further advance through a paint spraying system. A color may be painted around the base of the pole using the specifications in the ANSI 05.1-2017 Standard. A label printer may provide a weather resistant fully customizable tag or ticket which may be stapled by a stapler to the bottom using a heavy-duty printing and stapling system. The tag or ticket may be printed and stuck to the butt of the pole. In addition to or in replacement of the tag, customizable direct ink transfer and or thermal transfer can be applied to the base. All data information in the processes 200, 300 and 400 may be stored in the database 135 for updating product inventory. The database 135 may be integrated into the company's inventory for providing real time pole information corresponding to the pole product availability.

The advantages of the disclosed principles include providing an efficient and automated system and method to provide accurate pole measurements based on industrial standards while avoiding manual actions during the pole classifying process.

Figure 7:
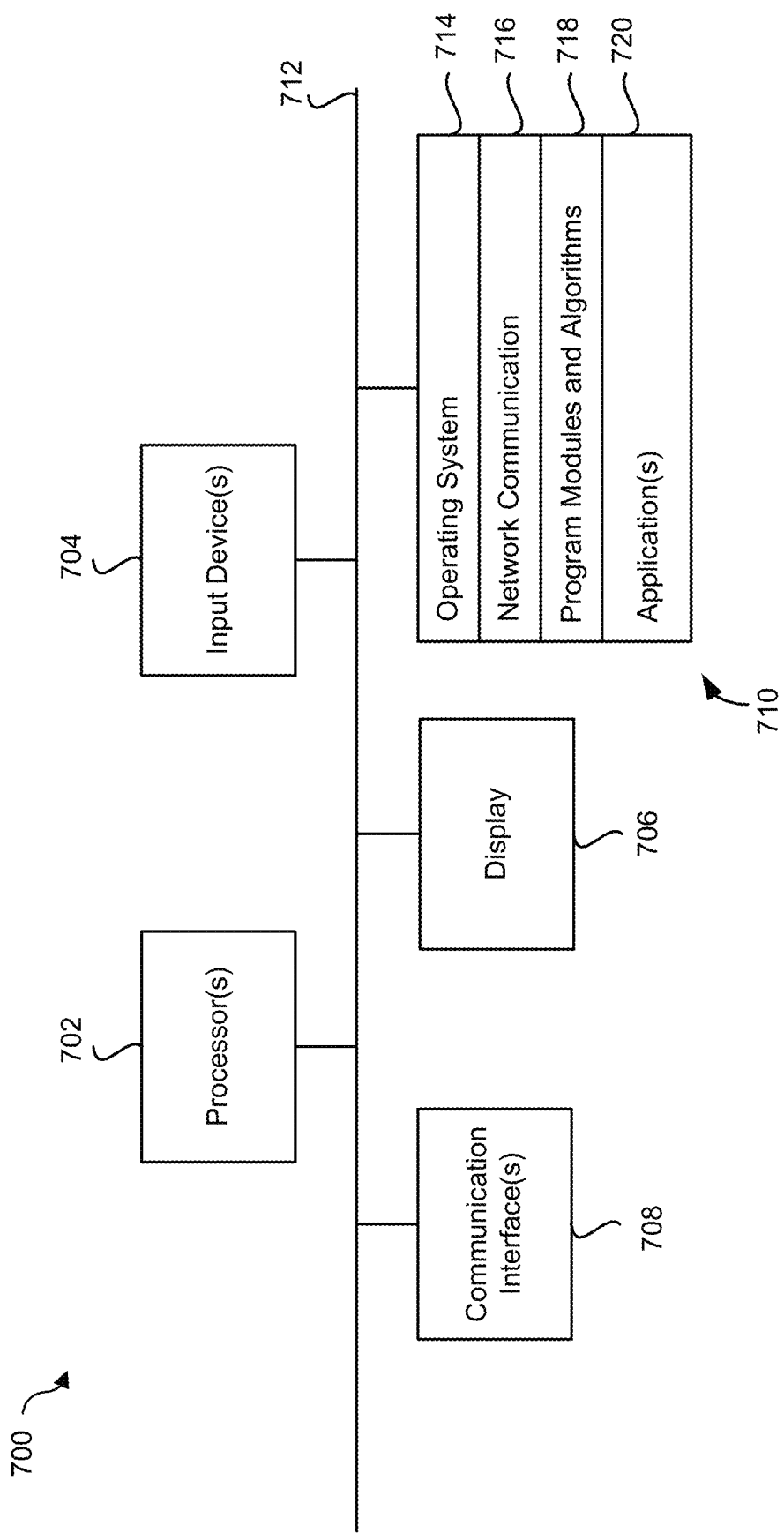
FIG. 7 is a block diagram of an example computing device according to some embodiments of the present disclosure.

FIG. 7 is a block diagram of an example computing device 700 that may be utilized to execute embodiments to implement processes including various features and functional operations as described herein. For example, the computing device 700 may function as the computing device 130, and the PLC equipment 140, or a portion or combination thereof. The computing device 700 may be implemented on any electronic device to execute software applications derived from program instructions, and includes but not limited to personal computers, servers, smartphones, media players, electronic tablets, game consoles, email devices, etc. In some implementations, the computing device 700 may include one or more processors 702, one or more input devices 704, one or more display devices or output devices 706, one or more communication interfaces 708, and memory 710. Each of these components may be coupled by bus 712, or in the case of distributed computer systems, one or more of these components may be located remotely and accessed via a network.

Processor(s) 702 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 704 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 706 such as a CRT (cathode ray tube) or LCD (liquid crystal display) monitor for displaying information to the user and a keyboard and a pointing device such as a mouse or a trackball by which the user can provide input to the computer. Display device 706 may be any known display technology, including but not limited to display devices using Liquid Crystal Display (LCD) or Light Emitting Diode (LED) technology.

Communication interfaces 708 may be configured to enable computing device 700 to communicate with other another computing or network device across a network, such as via a wired connection, a wireless connection, or a combination of wired and wireless connections. For example, communication interfaces 708 may include an Ethernet interface, an optical interface, a coaxial interface, an infrared interface, a radio frequency (RF) interface, a universal serial bus (USB) interface, a Wi-Fi interface, a cellular network interface, or the like.

Memory 710 may be any computer-readable medium that participates in providing computer program instructions and data to processor(s) 702 for execution, including without limitation, non-transitory computer-readable storage media (e.g., optical disks, magnetic disks, flash drives, etc.), or volatile media (e.g., SDRAM, ROM, etc.). Memory 710 may include various instructions for implementing an operating system 714 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 704; sending output to display device 706; keeping track of files and directories on memory 710; controlling peripheral devices (e.g., disk drives, printers, etc.) which can be controlled directly or through an I/O controller; and managing traffic on bus 712. Bus 712 may be any known internal or external bus technology, including but not limited to ISA, EISA, PCI, PCI Express, USB, Serial ATA or FireWire.

Network communications instructions 716 may establish and maintain network connections (e.g., software applications for implementing communication protocols, such as TCP/IP, HTTP, Ethernet, telephony, etc.). Application(s) and program modules 718 may include software application(s) and different functional program modules which are executed by processor(s) 702 to implement the processes described herein and/or other processes. For example, the program modules and algorithms 718 may include the classing algorithm and other program components for accessing and implementing application methods and processes described herein. The program modules 718 may include but not limited to software programs, machine learning models, objects, components, data structures that are configured to perform tasks or implement the processes described herein. The processes described herein may also be implemented in operating system 714.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system, such as a data server, or that includes a middleware component, such as an application server or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user computing device and server may generally be remote from each other and may typically interact through a network. The relationship of user computing devices and application server may arise by virtue of computer programs running on the respective computers and having a client-server relationship to each other.

Communication between various network and computing devices 1200 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A pole classing system, comprising:
an array of three-dimensional (3D) scanners;
a programmable logic controller equipment; and
a computing device comprising a first processor and a first memory, the computing device being in communication with the array of the 3D scanners and the programmable logic controller equipment via a network, the first memory storing an adaptive algorithm as computer-executable instructions executed by the first processor to:
control the array of the 3D scanners to concurrently generate a plurality of images of a pole made of soft wood from different directions and positions with respect to the pole, wherein soft wood is wood from at least one of a cedar, pine, fir, Douglas-fir, or larch species of tree,
generate a first pole dataset comprising dimensions and features of the pole determined from the images of the pole,
determine a class for the pole by comparing the dimensions of the pole with a first set of pole standard parameters, the first set of pole standard parameters comprises a specified set of dimensions for green condition poles per load carrying capacity and species, the specified set of dimensions including at least a full pole length, a circumference of the pole at a 6-foot point from a butt of the pole, a bottom pole dimension, and a head pole dimension,
generate a second pole dataset by selecting a partial first pole dataset, and
transmit the second pole dataset to the programmable logic controller equipment, the programmable logic controller equipment comprising a second processor and a second memory, the second memory storing a classing algorithm as computer-executable instructions executed by the second processor to:
process, based on;
a second set of pole standard parameters defining surface defects including at least a knot location, a knot size, and a knot group size,
the second pole dataset,
the images, and
the features of the pole,
to thereby optimize the determined class of the pole according to at least one surface defect included in the images and the features of the pole and generate an updated class of the pole by excluding the at least one surface defect and comparing a remainder of the pole with the first set of pole standard parameters.

2. The system of claim 1, wherein the features of the pole comprise at least one of a type, a location and dimensions of a defect on a surface of the pole.

3. The system of claim 1, wherein the computer-executable instructions are further executed by the first processor to:
build at least one pole model based on the pole images; and
generate a graphical representation to present the pole model with the dimensions and features of the pole on a display of the computing device.

4. The system of claim 1, wherein the instructions are further executed by the second processor to:
receive the second pole dataset from the first computing device;
determine a set of predetermined minimum circumferences at a 6 foot point from a butt associated with a full pole length of the second pole dataset;
determine a predetermined minimum circumference at the 6 foot point from the butt which is closest to the circumference at the 6 foot point from the butt of the second pole dataset; and
determine the class of the pole corresponding to the predetermined minimum circumference at the 6 foot point from the butt.

5. The system of claim 4, wherein the first set of pole standard parameters comprises at least one of a set of predetermined standard lengths of a pole, a set of predetermined minimum circumferences at 6 feet from the pole butt associated with a respective predetermined pole length, and a predetermined minimum circumference at the top of the pole.

6. The system of claim 1, wherein, for optimizing the determined class of the pole based on the second set of pole standard parameters, the computer-executable instructions are further executed by the second processor to:
detect and localize a defect on the surface of the pole;
determine a surrounding area around the location of the defect within a predefined depth value;
inspect an intensity image of the defect compared to the surrounding area of the pole image;
combine an original pole image and the intensity image to determine a total size of the defect;
generate a graphical representation to present the defect with a set of defect dimensions and with a defect location indicator on the image of the pole on a display of the PLC equipment; and
perform a pole classing optimization based on the features of the defect.

7. The system of claim 6, wherein the second set of pole standard parameters comprises a diameter (width, length) and a depth of a defect.

8. The system of claim 1, wherein the array comprises a plurality of time-of-travel scanner units, triangulation-based scanner units, or a combination thereof, the plurality of units being arranged to image different portions of the pole concurrently.

9. The system of claim 1, wherein the system comprises a vector motor configured to drive to facilitate in accurately measuring the pole.

10. The system of claim 1, wherein the system comprises a paint spraying system, a label printer and stapler.

11. A pole classing method, comprising:
controlling, by a computing device comprising a first processor and a first memory, an array of three-dimensional (3D) scanners to concurrently generate a plurality of images of a pole made of soft wood from different directions and positions with respect to the pole, wherein soft wood is wood from at least one of a cedar, pine, fir, Douglas-fir, or larch species of tree;
generating, by the computing device, a first pole dataset comprising dimensions and features of the pole determined from the images of the pole;
determining, by the computing device, a class for the pole by comparing the dimensions of the pole with a first set of pole standard parameters, the first set of pole standard parameters comprises a specified set of dimensions for green condition poles per load carrying capacity and species, the specified set of dimensions including at least a full pole length, a circumference of the pole at a 6-foot point from a butt of the pole, a bottom pole dimension, and a head pole dimension;
generating, by the computing device, a second pole dataset by selecting a partial first pole dataset; and
processing, by a programmable logic controller equipment comprising a second processor and a second memory, based on:
a second set of pole standard parameters defining surface defects including at least a knot location, a knot size, and a knot group size,
the second pole dataset,
the images, and the features of the pole,
to thereby optimize the determined class of the pole according to at least one surface defect included in the images and the features of the pole and generate an updated class of the pole by excluding the at least one surface defect and comparing a remainder of the pole with the first set of pole standard parameters.

12. The method of claim 11, wherein the features of the pole comprise at least one of a type, a location and dimensions of a defect on a surface of the pole.

13. The method of claim 11, further comprising:
building, by the computing device, at least one pole model based on the pole images; and
generating, by the computing device, a graphical representation to present the pole model with the dimensions and features of the pole on a display of the computing device.

14. The method of claim 11, further comprising:
determining, by the programmable logic controller equipment, a set of predetermined minimum circumferences at a 6 foot point from a butt associated with a full pole length of the second pole dataset;
determining, by the programmable logic controller equipment, a predetermined minimum circumference at the 6 foot point from the butt which is closest to the circumference at the 6 foot point from the butt of the second pole dataset; and
determining, by the programmable logic controller equipment, the class of the pole corresponding to the predetermined minimum circumference at the 6 foot point from the butt.

15. The method of claim 14, wherein the first set of pole standard parameters comprises at least one of a set of predetermined standard lengths of a pole, a set of predetermined minimum circumferences at the 6 foot point from the pole butt associated with a respective predetermined pole length, and a predetermined minimum circumference at the top of the pole.

16. The method of claim 11, wherein optimizing the determined class of the pole based on the second set of pole standard parameters comprises:
detecting and localizing a defect on the surface of the pole;
determining a surrounding area around the location of the defect within a predefined depth value;
inspecting an intensity image of the defect compared to the surrounding area of the pole image;
combining an original pole image and the intensity image to determine a total size of the defect;
generating a graphical representation to present the defect with a set of defect dimensions and with a defect location indicator on the image of the pole on a display of the PLC equipment; and performing a pole classing optimization based on the features of the defect.

17. The method of claim 16, wherein the second set of pole standard parameters comprises a diameter (width, length) and a depth of a defect.

18. A pole processing system, comprising:
a pole classing system comprising:
an array of three-dimensional (3D) scanners, the array comprising a plurality of time-of-travel scanner units, triangulation-based scanner units, or a combination thereof, the plurality of units being arranged to image different portions of the pole concurrently;
a programmable logic controller equipment; and
a computing device comprising a first processor and a first memory, the computing device being in communication with the array of the 3D scanners and the programmable logic controller equipment via a network, the first memory storing an adaptive algorithm as computer-executable instructions executed by the first processor to:
control the array of the 3D scanners to concurrently generate a plurality of images of a pole made of soft wood from different directions and positions with respect to the pole, wherein soft wood is wood from at least one of a cedar, pine, fir, Douglas-fir, or larch species of tree,
generate a first pole dataset comprising dimensions and features of the pole determined from the images of the pole,
determine a class for the pole by comparing the dimensions of the pole with a first set of pole standard parameters, the first set of pole standard parameters comprises a specified set of dimensions for green condition poles per load carrying capacity and species, the specified set of dimensions including at least a full pole length, a circumference of the pole at a 6-foot point from a butt of the pole, a bottom pole dimension, and a head pole dimension,
generate a second pole dataset by selecting a partial first pole dataset, and
transmit the second pole dataset to the programmable logic controller equipment, the programmable logic controller equipment comprising a second processor and a second memory, the second memory storing a classing algorithm as computer-executable instructions executed by the second processor to:
process, based on;
a second set of pole standard parameters defining surface defects including at least a knot location, a knot size, and a knot group size,
the second pole dataset,
the images, and
the features of the pole,
to thereby optimize the determined class of the pole according to at least one surface defect included in the images and the features of the pole and generate an updated class of the pole by excluding the at least one surface defect and comparing a remainder of the pole with the first set of pole standard parameters;
a system for conveying the pole comprising one or more decks, conveyors, chain flights, and vector motors;
a cutting device;
a paint spraying system; and
a label printer and stapler or other marking device.

* * * * *